US007690295B2

(12) United States Patent
Ishizuka

(10) Patent No.: US 7,690,295 B2
(45) Date of Patent: Apr. 6, 2010

(54) METHOD FOR PRODUCING WASH-FREE RICE AND APPARATUS THEREFOR

(76) Inventor: Takeshi Ishizuka, 2-7-501, Takahara-4-chome, Inzai-shi, Chiba-ken 270-1342 (JP)

(*) Notice: Subject to any disclaimer, the term of this patent is extended or adjusted under 35 U.S.C. 154(b) by 837 days.

(21) Appl. No.: 10/581,955

(22) PCT Filed: Nov. 17, 2004

(86) PCT No.: PCT/JP2004/017076

§ 371 (c)(1),
(2), (4) Date: Jun. 7, 2006

(87) PCT Pub. No.: WO2005/056190

PCT Pub. Date: Jun. 23, 2005

(65) Prior Publication Data

US 2007/0151585 A1      Jul. 5, 2007

(30) Foreign Application Priority Data

Dec. 10, 2003  (JP)  ............................. 2003-411674
Sep. 7, 2004   (JP)  ............................. 2004-259715

(51) Int. Cl.
*B02B 1/06*   (2006.01)
*B02C 17/02*  (2006.01)
(52) U.S. Cl. ............................. 99/519; 99/522; 241/86
(58) Field of Classification Search .................. 99/519, 99/520, 522; 241/86; 426/481, 482; *B02B 3/00, B02B 7/00, 3/06, 5/02, 3/10*
See application file for complete search history.

(56) References Cited

U.S. PATENT DOCUMENTS 4,330,340 A * 5/1982 Carlton .................... 106/281.1

(Continued)

FOREIGN PATENT DOCUMENTS

JP         5/28467         4/1993

(Continued)

OTHER PUBLICATIONS

Derwent abstract of JP 10-080641 A, published Feb. 1998, Kondo.*

(Continued)

*Primary Examiner*—Tu B Hoang
*Assistant Examiner*—Lindsey C Teaters
(74) *Attorney, Agent, or Firm*—James Creighton Wray; Meera P. Narasimhan

(57) ABSTRACT

The present invention provides a method for producing wash-free rice which does not require washing before cooking. The method comprises the following steps: preparing polished rice from brown rice polished by a built-in rice polishing machine and sifted by a built-in sifting machine and/or polished rice from outside sources; preparing rice polishing bran (parched bran) used as an abrasive; preparing a mixture consisting of the polished rice and the abrasive in a desired ratio; stirring the mixture in a tank by revolving stirring blades such that the polished rice and the abrasive are mutually rubbed in order to strip sticking bran including skin bran and foreign debris from the surfaces of the rice grains; sifting the stirred mixture in order to separate bran from the rice; separating residual sticking bran and foreign debris from rice grains in order to obtain finished wash-free rice; and recovering the separated bran for recycling as the abrasive.

8 Claims, 7 Drawing Sheets

U.S. PATENT DOCUMENTS

| | | | | | |
|---|---|---|---|---|---|
| 4,505,777 | A | * | 3/1985 | Richter | 162/102 |
| 5,975,441 | A | * | 11/1999 | Burkholder | 241/24.12 |
| 2002/0060181 | A1 | * | 5/2002 | Schreiber | 210/396 |

FOREIGN PATENT DOCUMENTS

| | | | |
|---|---|---|---|
| JP | | 6/170255 | 6/1994 |
| JP | | 10/80641 | 3/1998 |
| JP | | 2001/96177 | 4/2001 |
| JP | | 2001/286773 | 10/2001 |
| JP | | 2001/327881 | 11/2001 |
| JP | | 2002/11358 | 1/2002 |
| JP | | 2002/113374 | 4/2002 |
| JP | 2002238479 A | * | 8/2002 |
| JP | | 2002/248359 | 9/2002 |

OTHER PUBLICATIONS

Machine translation of JP 10-080641 A, Kondo, Mar. 1998.*
Machine translation of JP 2002113374A, Saito, Sep. 2002.*
Machine translation of JP 2002248359A, Otsuka, Apr. 2002.*
Human Translation of JP 10-080641 A, Kondo, Mar. 1998.*
Human Tranlsation of JP 2002-113374 A, Saito, Apr. 2002.*
Human Translation of JP 2002-238479 A, Ishizuka, Aug. 2002.*
Human Translation of JP 2002-248359 A, Otsuka, Sep. 2002.*

* cited by examiner (a)

(b)

METHOD FOR PRODUCING WASH-FREE RICE AND APPARATUS THEREFOR

This application claims the benefit of Japanese Application No. 2003-411674 filed Dec. 10, 2003, Japanese Application No. 2004-259715 filed Sep. 7, 2004 and PCT/JP2004/017076 filed Nov. 17, 2004, which are hereby incorporated by reference in their entirety.

FEILD OF INVENTION

The present invention relates to a method and an apparatus for producing wash-free rice, which does not require washing before cooking.

RELATED BACKGROUND ARTS

Most of the methods for producing wash-free rice employ washing (by water) steps (i.e. wet processes). However, some methods employ dry processes. One of such dry processes disclosed in Japanese laid open patent No.2001-286773 (hereinafter referred as Ref.1) is invented to provide a simply structured compact waterless rice washing apparatus which can be constituted at a low cost and be used by small food service industries, restaurants, hotels, hospitals and the like. The disclosed waterless rice washing machine comprises supply units for supplying polished rice and interposing matter to be mixed with the rice, a rice washing container for accommodating a mixture of the polished rice and the interposing matter and a separating unit for separating pure polished rice, the interposing matter and bran from the washed mixture, wherein: the supply units are arranged above the rice washing container, the separating unit is arranged below the rice washing container and a plurality of baffle plates are arranged in the rice washing container.

Japanese laid open patent No.2001-96177 (hereinafter referred as Ref.2) discloses polished rice washing apparatus which can remove oxidized layers and bran layers formed on the surfaces of polished rice grains, and bran deposited in grooves of polished rice grains without damaging the surfaces of polished rice grains. The disclosed polished rice washing apparatus comprise a rice inlet, a rice polishing chamber, a pair of rice polishing plates in which brushes are buried, a cover for preventing rice from spilling out of the rice polishing plates, a driving means for driving the polishing plates, another cover for preventing bran from spilling out of the rice polishing chamber and a polished rice outlet, wherein: the rice inlet and the rice outlet are communicated each other via the rice polishing chamber, the rice polishing plates are arranged inside of the rice polishing chamber such that tips of the brushes respectively arranged on the rice polishing plates are directed to each other and the cover for the polishing plates are perforated. The apparatus obtained by the disclosed invention can remove oxidized layers and bran layers formed on the surfaces of polished rice grains and bran deposited in grooves of polished rice grains by brushes arranged in the upper part and lower part of the apparatus without damaging the surfaces of polished rice grains.

DISCLOSURE OF THE INVENTION

Problems to be Solved by the Invention

However, in the invention disclosed by Ref. 1, since crushed natural foodstuff or extruded fine foamed bodies are employed as the interposing matter, quality of obtained wash-free rice by the apparatus is not perfectly guaranteed.

In the invention disclosed by Ref. 2, the brushes are employed as a means for removing the bran on the surfaces of the rice grains. Since 20% of fat remains on the surfaces of the bran, to use the brush is problematic from practical points of views such as a removing efficiency of bran, an operability of the apparatus and a contamination in the brush. cooked rice still bears smell of the bran. Some portion of the removed bran sticks to the surfaces of rice grains again, so that one or two times of washes for polishing are required to avoid cooked rice from bearing smell of the bran.

Even if the polished rice grains are dried after getting wet with water in the so-called wet method for producing wash-free rice, molds and germs are apt to form on the polished rice grains due to remaining water in the rice grains. And even if the polished rice grains are coated with starch in order to protect surfaces of the rice grains, the coated starch becomes gradually deteriorated, which means quality of the wash-free polished rice is deteriorating so that the polished rice can not be reserved for a long period.

The present invention is carried out in view of the above-mentioned problems in order to provide a method for producing wash-free rice and an apparatus to realize the method. The method for producing wash-free rice by the present invention does not use any water, but only uses rice polishing bran (parched bran), of which patent right is owned by the applicant, as an abrasive in order to remove bran and foreign debris sticking to surfaces of rice grains. Since the parched bran is hard and dry and does not contain any fat, the parched bran can remove sticking bran to the surfaces of the rice grains effectively by stirring with rice grains, as if dry sand polishes the grains. In addition, the parched bran can be separated easily from the polished rice and does not bear any smell of raw bran. The method and the apparatus by the present invention for producing wash-free rice utilize the above-mentioned properties of the parched bran. The method for producing wash-free rice by the present invention comprises a stirring step, a sifting step, a separating step and a bran recovering and recycling step in order to use the recovered and recycled bran as the abrasive. The apparatus comprises not only units to operate the above-mentioned steps, but an electrostatic dust eliminating means which prevent the separated bran and foreign debris from sticking to the polished rice grains in steps succeeding to the sifting step.

Means to Solve the Problems

The above-mentioned problems are solved by the methods or apparatuses specified as follows.

(1) A method for producing wash-free rice which does not require washing before cooking, comprising steps of: preparing polished rice from brown rice polished by a built-in rice polishing machine and sifted by a built-in sifting machine and/or polished rice from outside sources; preparing rice polishing bran (parched bran) used as an abrasive; preparing a mixture consisting of the polished rice and the abrasive in a desired ratio; stirring the mixture in a tank by revolving stirring blades such that the polished rice and the abrasive are mutually rubbed in order to strip sticking bran including skin bran and foreign debris from the surfaces of rice grains; sifting the stirred mixture in order to separate bran from the rice grains; separating residual sticking bran and foreign debris from the sifted rice grains in order to obtain finished wash-free rice; and recovering the separated bran for recycling the bran as the abrasive, wherein: in the stirring step, a revolving rate of the stirring blades is raised, if a surface level of the mixture in the tank is lower than a predetermined level either 1) at the end of the wash-free rice producing operation or 2) the mixture is not filled to capacity of the tank.

(2) The method according to (1), wherein: the sifting step is carried out in a tilted cylindrical sifting machine of which contour is formed by a mesh net such that the bran is separated from rice grains as the mixture being flowed downward by revolving the tilted cylindrical sifting machine.

(3) The method according to (1), wherein: the separating step is a step for separating foreign debris such as fine powders and the like sticking to the surface of the sifted rice grains, and the separating step is carried out by a one or more finishing units, each of the finishing unit comprising: a supply guide means for supplying rice grains uniformly; a cylindrical rotary brushing means for brushing the surfaces of the rice grains; a regulating means for smoothing a layer of supplied rice grains and regulating a holdup of the supplied rice grains, and a combing wedge for cleaning brushes of the cylindrical rotary brushing means, wherein: the rice grains are supplied uniformly in a reverse direction to a revolving direction of the cylindrical rotary brushing means as regulating the holdup and a retention time of the rice grains so that the rice grains are rubbed by the cylindrical rotary brushing means in order to strip foreign debris such as fine powders and the like sticking to the surfaces of the rice grains; finished rice grains are taken out as wash-free rice; and the separated foreign debris such as fine powders and the like are sucked and discharged by a solid-gas separating means.

(4) The method according to any one of (1) to (3), wherein: ionized air from an ion generating apparatus is supplied to the sifting step and the separating step in order to eliminate static electricity so that the foreign debris such as fine powders and the like are prevented from sticking to the finished rice grains again.

(5) An apparatus for producing wash-free rice which does not require washing before cooking, comprising: a polished rice tank for accommodating polished rice from brown rice polished by a built-in raw rice polishing machine and sifted by a built-in sifting machine or polished rice from outside sources; a stirring means for mixing a mixture consisting of the polished rice and an abrasive in a desired ratio by revolving stirring blades; a transportation means for transporting the stirred mixture consisting of policed rice and bran; a sifting means for sifting bran from the polished rice; a separating means comprising cylindrical rotary brushing means for stripping residual foreign powders such as fine powders and the like from the surfaces of rice grains in order to obtain finished wash-free rice grains; and a separated bran recovering means for recycling the bran as the abrasive, wherein: the stirring means comprises: a vertical revolving axis equipped in a vertical rotary housing: a plurality of revolving blades arranged radially around the vertical revolving in a plurality of stages; a shut-off valve arranged at the bottom of the vertical rotary housing; and a control means for controlling a revolving rate of the revolving blades in accordance with a level of the mixture in the vertical rotary housing and for controlling a supply amount of the stirred mixture for the next step.

(6) The apparatus according to (5), wherein: the sifting means is a tilted cylindrical sifting machine of which contour is formed by a meshed net; and one or more series of guides made of a plurality of baffle plates are arranged obliquely inside of the tilted cylindrical sifting machine so as to sift the mixture as being revolved and moved downward for separating the bran from the rice grains.

(7) The apparatus according to (5), wherein: the separating means is a means for separating foreign debris such as fine powders and the like sticking to the surface of the sifted rice grains, and the separating means is constituted by one or more separating units, each of the separating units comprising: a supply guide means for supplying rice grains uniformly; a cylindrical rotary brushing means for brushing the surfaces of the rice grains; a regulating means for smoothing a layer of supplied rice grains and regulating a holdup of the supplied rice grains; and a combing wedge for cleaning brushes of the cylindrical rotary brushing means, wherein: foreign debris such as fine powders and the like are separated from rice grains; and the separated foreign debris such as fine powders and the like are sucked and discharged by a solid-gas separating means.

(8) The apparatus according to (7), wherein: the separating unit further comprises: a downwardly tilted supply guide means constituted by a base plate and parting plates widening toward the end arranged on the base plate; a cylindrical rotary brushing means arranged brushes on its cylindrical body below the end of the supply guide means, wherein, the brushes are revolved so as to lift falling rice grains; a regulating means for smoothing a layer of the supplied rice grains and for regulating a holdup of the supplied rice grains by varying a gap between the cylindrical revolving brushing means as regulating a tilting angle of the regulating means in accordance with supplied amount of rice grains; and a coThing wedge which always cleans the brushes of said cylindrical rotary brushing means.

(9) The apparatus according to (7), wherein: the separating unit comprises: a supply guide means; a supply guide aiding means; a cylindrical rotary brushing means; and a combing wedge; wherein: the supply guide means and supply guide aiding means, each constituted by a permeable net with a sifting structure, are arranged at a predetermined slanting angle; a gap formed between the end of the supply guide means and the end of the cylindrical rotary brushing means is maintained such that falling rice grains are lifted by the revolving brushes of the cylindrical rotary brushing means; the coming wedge always cleans the brushes of said cylindrical revolving brushing means; and all components are designed beforehand in order to fit the all components in predetermined position easily.

(10) The apparatus according to any one of (5) to (7), wherein: a static electricity eliminating means is connected to the sifting means and separating means; and the static electricity eliminating means comprises an ionized air generating apparatus and an ionized air transporting means.

Effects Attained by the Invention

The present invention can provide the method and apparatus for producing wash-free rice. The method for producing wash-free rice by the present invention uses rice polishing bran (parched bran), of which patent right is owned by the applicant (Japanese patent No.3453127), as the abrasive in order to remove bran and foreign debris sticking to surfaces of rice grains. The method for producing wash-free rice by the present invention comprises the stirring step, the sifting step, the separating step and the bran recovering and recycling step in order to use the recovered and recycled bran as the abrasive. The apparatus comprises not only the units to operate the above-mentioned steps, but the electrostatic dust eliminating means, which supplies ionized air to the separated bran and foreign debris in order to preventing them from sticking to the polished rice grains in the steps succeeding to the sifting step.

Wash-free rice treated with water or coated with starch may generate mold or may breed germs on the surfaces of the treated rice grains. Most of the dry wash-free rice in the market still bears about 20% of fat on the surfaces of rice grains due to sticking bran to the surfaces, so that cooked rice smells an unpleasant odor originated from raw bran.

Since the apparatus by the present invention does not use any water and uses only parched bran obtained from defatted bran, no foreign debris go into the polished rice, so that the obtained rice is safe and does not bear any unpleasant odor from raw bran and bears a quite small amount of fat on the surfaces of the rice grains. Thus the present invention can provide the polished rice of high quality which can be stored for a long period compared with wash-free rice treated by water, and can provide the wash-free rice which does not require washing before cooking.

Figure 1:
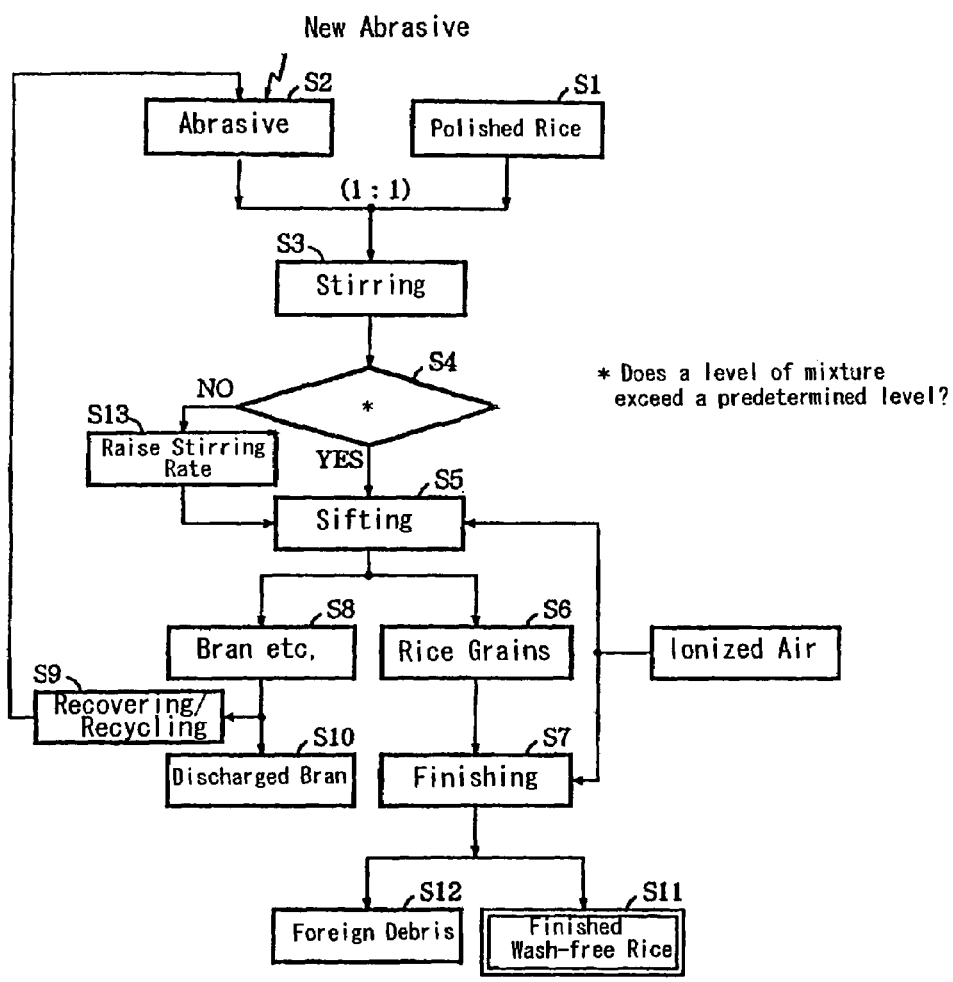
FIG. 1 is a flow chart showing an example of producing steps of the wash-free rice.

EXPLANATION OF REFERENCE CHARACTERS 1 abrasive supply tank
2 polished rice supply tank
3 stirring tank
3a stirring blades
3b revolving axis
3c revolving drive unit
4 shut-off valve
5 transportation means
6 sifting machine (tilted rotary drum shifting machine)
6a cylindrical body (formed by a meshed net)
6b boxed housing
6c driving means
6d baffle plate
7 separated bran recovering and recycling means
8 level sensor
9 separating means
9a supply guide means
9b cylindrical rotary brushing means
9c supply smoothing and regulating means
9d, 9d' combing wedge
9B base plate
9S parting plate
10 blown air inlet
Br brush
11a continuous shut-off valve
13 solid-gas separating means
13a exhausting air pipe
13b suction fan
14a ion generating apparatus
14b ionized air supply means
14c ionized air inlet
15 blower
15a ionized air mixer
20 rice polishing unit
20a rice polishing machine
20b sifting machine
20c dust collector
20d an exhausting blower (suction blower)
20e conveying means
ai ionized air
Ri rice grains
U1 to U5 finishing units
pa fine powders
70 supply guide means
71 supply guide aiding means
72 cylindrical rotary brushing means
73 combing wedge

PREFERRED EMBODIMENT BY THE PRESENT INVENTION

Embodiments of the methods and apparatuses for producing wash-free rice by the present invention are explained in detail as referring to drawings.

Embodiment

Hereinafter, a method for producing wash-free rice, as one of embodied examples, is explained as referring to FIG. 1.

Polished rice is prepared (step S1). The polished rice may be supplied directly from an ordinary rice polishing machine equipped with the apparatus by the present invention or may be supplied from other polishing machines. Rice polishing bran (parched bran: registered as Japanese patent No.3453127 by the present inventor) used for as an abrasive is prepared (step S2). The polished rice and the abrasive in a desired ratio, for example 1:1 in volume, are stirred by stirring blades 3a (see FIG. 2) so as to mix them (step S3). In this step the polished rice and the abrasive are mutually rubbed in order to strip bran including superficial bran and foreign debris sticking to the surfaces of rice grains from the rice grains. While a mixture of the polished rice and the abrasive is stirred, the level of the mixture is measured by a level sensor 8 (see FIG.2) in order to determine whether the mixture exceeds a predetermined level (or depth) or not (step S4). If the mixture exceeds the predetermined level, the mixture is transported to a tilted rotary drum sift 6 (FIG.2) for sifting (step S5) via a transporting means 5 such as a bucket conveyer, a screw conveyer, a pneumatic conveyer or the like. A cylindrical body 6a formed by a meshed net (see FIG.4(a)) is wound around the outer surface of the rotary drum sifting machine 6 in which the transported mixture is sifted. The sifted rice is extracted from the rotary drum sifting machine (step S6) and sent to the separating means constituted by a plurality of units (U1, U2...Un) each comprising a supply guide means 9a, a cylindrical rotary brushing means 9b, a regulating means 9c for smoothing a layer of rice grains and for regulating rice holdup and a combing wedge 9d, d'. Residual bran and foreign debris are separated from the sifted rice in the separating means (step S7). Separated rice is extracted as finished wash-free rice (step S11). Foreign debris such as fine powders and the like are discharged by a suction discharging means having a gas-solid separating means 13 (see FIG.2) such as a cyclone, a bag-filter or the like (step S12), and at the same time air is exhausted via a suction fan 13b.

Whole bran sifted at the sifting step (step S5) and separated from the rice (step S8) is collected by a separated bran recovering and recycling means. Then the bran is returned to an abrasive supply tank 1 (see FIG.2) and used as the abrasive again (step S9). When the recycled bran is deteriorated it is replaced with a new abrasive (parched bran for rice polishing). Deteriorated bran is discharged and dumped (step S10). Some of the deteriorating bran may be recycled and used with newly added fresh bran.

When the level of the mixture measured at step S4 is lower than the predetermined level, a revolving rate of the stirring blades is raised such that the pressure of the mixture is raised to a pressure of the predetermined level at a regular revolving rate (step S13). In raising the revolving rate of the stirring blades, enough friction between the rice and the abrasive is obtained and almost homogeneous treatment can be attained even when a continuous wash-free rice producing procedure is finished or amount of the mixture is less than the predetermined level.

The rice polishing bran is parched at a high temperature (in the present embodiment ca. 120° C.), so that the parched bran contains virtually no water, forms dried hard granules and has no smell of raw bran. Therefore the parched bran is an optimistic abrasive for polishing rice, which shows excellent abrasive effects. Due to the properties mentioned above, the parched bran can be easily passed through meshes of the net without clogging the meshes.

Figure 2:
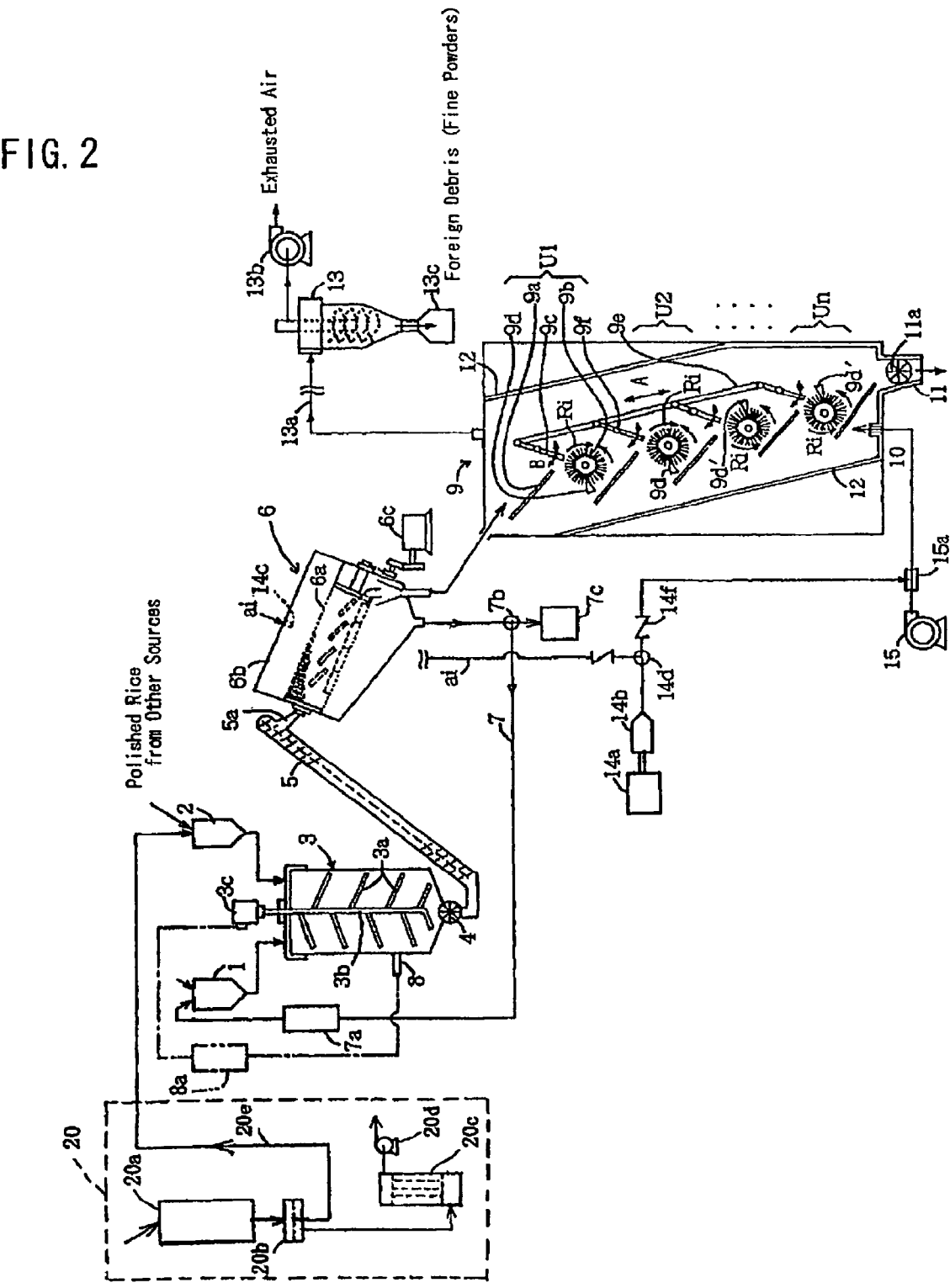
FIG. 2 is a schematic view illustrating an example of the whole constitution of the apparatus for producing the wash-free rice.

As shown in FIG. 2, ionized air from an ion generating apparatus 14a is supplied to the sifting step and separating step in order to eliminate static electricity from the rice grains Ri so that the foreign debris pa such as fine powders and the like are prevented from sticking to the rice grains Ri again.

Skin bran in the present invention includes all bran sticking to the surfaces, pits and grooves of the rice grains.

Hereinafter, arrangements and functions of the apparatus for producing wash-free rice are explained as referring to drawings.

In FIG. 2, a reference numeral "1" is the abrasive supply tank, a reference numeral "2" is a polished rice supply tank which accommodates polished rice from a rice polishing unit 20 attached to the apparatus for producing wash-free rice or polished rice from outside sources. The two supply tanks are connected to a stirring tank 3 where the bran and the polished rice in 1:1 of a volume ratio are mixed. In the stirring tank 3, stirring blades 3a attached to a revolving axis 3b are revolved by a revolving drive unit 3c at a predetermined rate. A mixture consisting of the well mixed bran and the polished rice is transported to a sifting machine 6 via a shut-off valve 4 such as a rotary valve or the like and via the transportation means 5 such as a bucket conveyer, a screw conveyer, a pneumatic conveyer or the like. The shut-off valve 4 has a plurality of rotary vanes and can control a feeding amount of the mixture by changing a rotating rate of the vanes. A reference numeral "20a" is the rice polishing machine, a reference character "20b" is a sift, a reference character "20c" is a dust collector, a reference character "20d" is an exhausting blower (suction blower), reference character "20e" is conveying means such as a bucket conveyer, a pneumatic conveyer, an eccentric motor, electromagnetically driven conveyer or the like.

The level sensor 8 is arranged at a position ca. ⅓ height from the bottom of the stirring tank 3. The level sensor is connected to a controlling means 8a such as a control unit or the like, which controls the revolving rate of the stirring blades 3a and the feeding rate of the mixture to the next step in accordance with the measured level.

The level sensor 8 is not limited one, but two or more may be employed in order to control more finely.

A sampling cock for extracting a sample may be arranged (not shown in the drawings) at the bottom of the stirring tank 3 in order to determine the stirring rate and the rotating (feeding) rate of the shut-off valve 4 by checking status of the sample and taking environmental conditions such as a temperature, humidity and the like into consideration. The rotating (feeding) rate of the shut-off valve 4 is varied in accordance with the revolving rate of the revolving drive unit 3c. For example, when the revolving rate of the revolving drive unit 3c is slow, the rotating rate of the rotary valve 4 is raised. In other words, when a holdup of the mixture in the tank is large, the rotating rate of the rotary valve 4 is raised so as to raise the discharging rate (feeding rate to the next step).

On the contrary, the revolving rate of the revolving drive unit 3c is fast, the rotating rate of the rotary valve is lowered. In other words, when the holdup of the mixture in the tank is small, the rotating rate of the rotary valve 4 is lowered so as to lower the discharging rate (feeding rate to the next step).

The above-mentioned rate varying controls are usually executed at the end of the continuous procedure or when supply amount of the mixture is changed due to some reasons. But it is preferable to keep these rates constant in the middle of the continuous operation. The control unit may be switched to an automatic control to a manual control, and vice versa.

The stirring blades 3a illustrated in FIG. 2 show a herringbone like structure, but stirring blades 31a constituted by a plurality of horizontally twisted long plate around the revolving axis may be arranged in a straight drum tank 31 as shown in FIG. 3(a); comb-like stirring blades 32a constituted by a plurality of rods around the revolving axis may be arranged in a straight drum tank 32 as shown in FIG. 3(b) or comb-like stirring blades 33a constituted by a plurality of rods (similar to FIG. 3(b)) around the revolving axis may be arranged in a reverse conical drum tank 33 as shown in FIG. 3(c).

Figure 3:
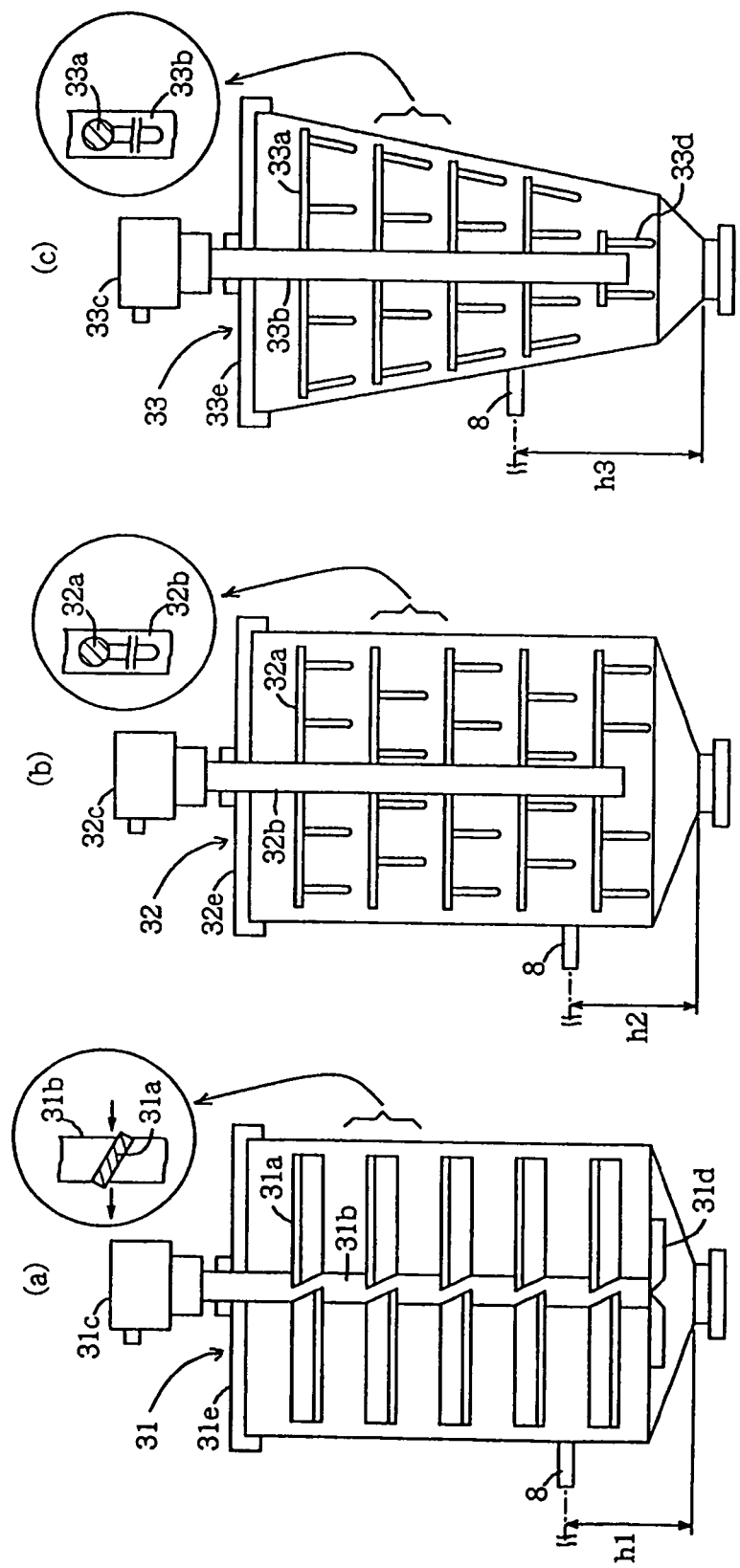
FIG. 3 is schematic side views illustrating the stirring means: (a) angled mixing blades are arranged in a straight drum; (b) comb-like blades constituted by rods are arranged in a straight drum and (c) comb-like blades constituted by rods are arranged in a reversed conical drum.

In FIG. 3, reference characters 31c, 32c and 33c are revolving drive units, reference characters 31b, 32b and 33b are revolving axe to which the stirring blades are attached and reference characters 31d and 33d are revolving blades for delivering the mixture. Reference characters 31e, 32e and 33e are racks for fixing the revolving drive units to the tanks. A reference numeral "8" is the level sensor, for example such as a capacitance level sensor, which is attached to the tank ca. ⅓ height from the bottom as shown h1, h2 and h3 in FIG. 3. But it is not limited to ⅓ height from the bottom.

Usually a bucket conveyer, a screw conveyer or the like is employed as the transportation means 5, which is connected to the next step, namely to the sifting machine 6, but a pneumatic conveyer may be employed.

Gravity transportation units may be used in all over the wash-free rice producing system, if the system has a sufficient height to arrange the stirring tank 3 at a highest position in the system.

FIG. 4(a) is the partially cut-out schematic side view illustrating the structure of the sifting machine.

The sifting machine 6 is a rotary drum sifting machine, which is downwardly tilted. A cylindrical body 6a, constituted as a revolving part, which consists of most of the sifting machine, is formed by a meshed net. As shown in FIG. 4(a), a plurality of baffle plates 6d are slantingly fitted one after another inside the cylindrical body 6a. Since the outer peripheral surface of cylindrical body is formed by the meshed net with a mesh size which can keep rice grains inside the cylindrical body, so that the rice grains are successively moved forward by revolving the cylindrical body, and at the same time, bran of which size is smaller than that of the rice grains, is discharged through the mesh to outside the cylindrical body. The remaining rice grains inside the cylindrical body is delivered to the next step via outlets 6*i* and 6*f*.

Ionized air from the ion generating unit is supplied to a boxed housing of the sifting machine 6 via ionized air inlet 14*c* at least while the cylindrical body 6*a* is revolving. Thus the ionized air fills inside of the boxed housing so that static electricity is eliminated from the rice grains and the bran by antistatic effects of the ionized air.

The cylindrical body 6*a* formed by the net and its revolving axis 6*h* are fixed to and supported by the boxed housing 6*b*. A drive transmission unit 6*e* is arranged at the end of the revolving axis 6*h* extending outside of the boxed housing 6*b*, and connected to a driving means 6*c* such as motor or the like.

Figure 4:
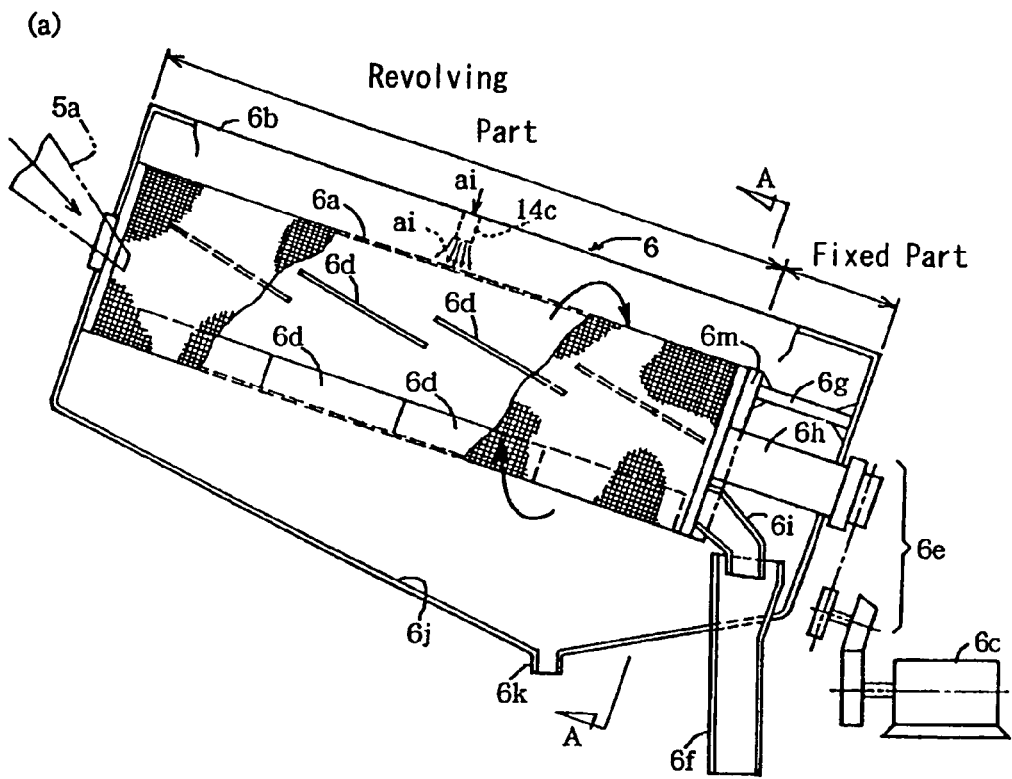
FIG. 4(a) is a partially cut-out schematic side view illustrating a structure of the sifting means and FIG. 4(b) is a cross-sectional view viewed along A-A line in FIG. 4(a).
Figure 4:
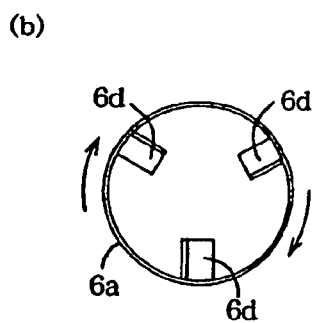

An outlet 6*k* connected to the separated bran recovering and recycling means 7 is arranged at the bottom of the boxed housing such that the outlet 6*k* can easily recover the bran sifted outside of the cylindrical body (see FIG. 4(*a*)). A control unit 7*a* for controlling the amount of the separated bran to be transported, regulating valve 7*b* for regulating the amount to be transported and a reservoir 7*c* for the discharged bran are arranged in the separated bran recovering and recycling means 7.

A reference character "6*g*" in FIG. 4(*a*) is a stay for reinforcing and supporting a supporting member 6*m* which bears a sliding surface against the lower end of the cylindrical body 6*a*.

The sifting machine 6 is not limited to the above-explained embodiment, but other driving method such as an eccentric motor, an electromagnetic method or the like may be employed. Other structures such as a reciprocating box, a circular revolving or the like may be also employable. It is needless to say that the ionized air for discharging static electricity is necessary in any types of sifting machines.

A reference character 5*a* is an outlet of the transportation means 5, which is led to the sift 6.

FIG. 4(*b*) is the cross-sectional view of the cylindrical body 6*a* viewed along A-A line in FIG. 4(*a*). As shown in FIG. 4(*b*), the baffle plates are arranged such that the baffle plates divide the inner surface of the cylindrical body 6*a* into three areas. FIG. 4(*b*) shows an example of a clockwise rotation as depicted by arrows. The height of the baffle plates is depicted ca. ¼ of the diameter of the cylindrical body 6*a*, but it is not limited to this height.

Figure 5:
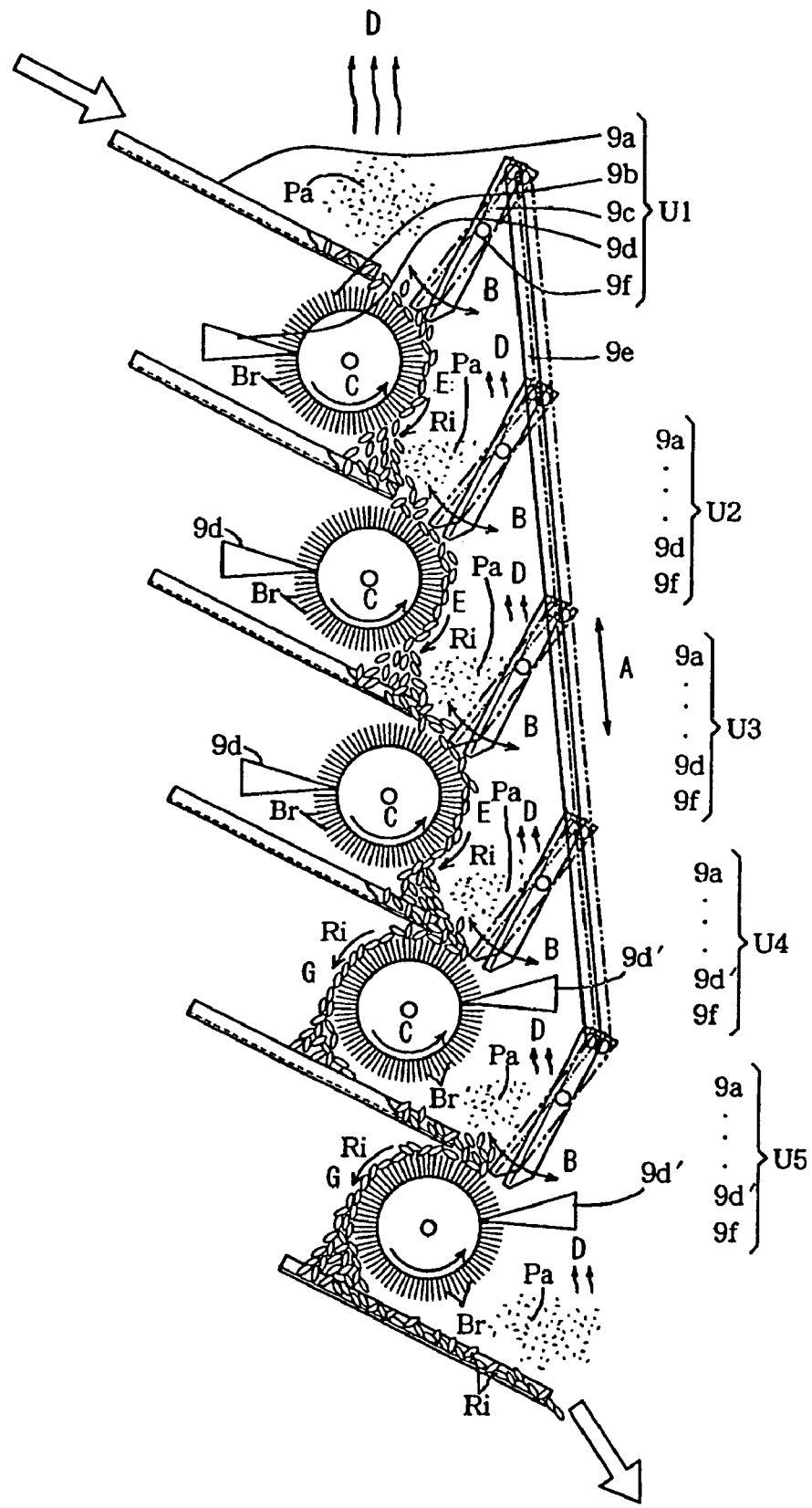
FIG. 5 is a schematic side view illustrating combined units of a separating means.

FIG. 5 is the schematic side view illustrating the separating means 9 constituted by finishing units U1 to U5.

Figure 6:
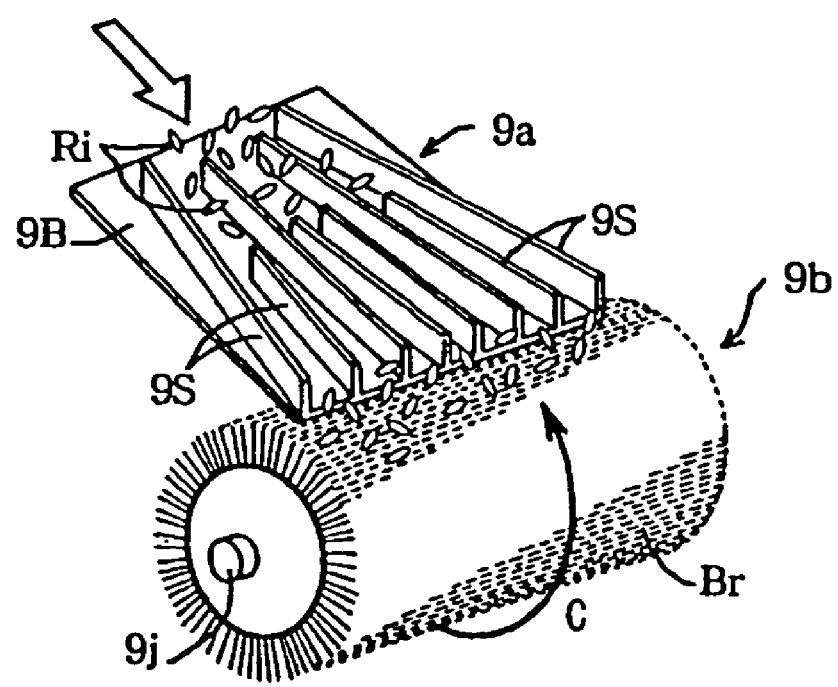
FIG. 6 is a perspective view illustrating a supply guide means and a cylindrical rotary brushing means.

As shown in FIG. 6, the finishing unit U1 comprises a downwardly tilted supply guide means 9*a* constituted by a base plate 9B and parting plates 9S widening toward the end arranged on the base plate 9B, a cylindrical rotary brushing means 9*b* constituted by a plurality of brushes Br planted on a cylinder located under the end of the supply guide 9*a* and a revolving axis 9*j* which revolves the brushes Br in a direction C (see FIG. 6) so as to lift falling rice grains Ri, a combing wedge 9*d* which cleans brushes Br of the cylindrical rotary brushing means 9*b* and a supply smoothing and regulating means 9*c* which adjusts a gap between itself and the brushes Br by varying its slanting angle.

The supply smoothing and regulating means 9*c* can be swung around a supporting axis 9*f* by moving a common connecting arm 9*e* back and forth in a direction A as shown in FIG. 5, so that it can regulate a rice holdup as smoothing a layer of supplied rice by swinging the supply smoothing and regulating means 9*c* in a direction B to change the slanting angle so that the gap between the supply smoothing and regulating means 9*c* and the brushes Br is adjusted. Respective supply smoothing and regulating means 9*c* in respective finishing units U1 to U5 are linked by the common connecting arm 9*e* so that they are swung together.

As shown in FIG. 5, in the finishing units U1 to U3, which constitute the separating means 9, the gaps between the brushes and the supply smoothing and regulating means 9*c* are adjusted by varying the angels of the supply smoothing and regulating means 9*c* for regulating the holdup volumes and retention times of the rice, so that the rice grains are rubbed by brushes revolving in a reverse direction (in a direction C as shown in FIG. 6) as hopping on the brushes, then the rice grains Ri are falling to the next unit along with the revolving brushes in a direction E. At the same time foreign debris such as fine powders and the like remaining on the rice grains are sucked and discharged by a suction fan 13*b*.

In the finishing units U4 and U5, the rice Ri is supplied in the same direction (in a direction G) as in the revolving directions (in the direction C) of the brushes Br, so that the rice is rubbed more tenderly than in the units U1 to U3. In the finishing units U4 and U5, reference character 9*d'* is assigned to combing wedges.

Preferably properties such as a thickness, hardness, a length and a planting density of the brushes in the cylindrical rotary brushing means 9*b* are determined such that the rice grains Ri are rubbed by the brushes as hopping on the brushes.

In the present embodiment, the finishing units U1 to U3 and the finishing units U4 and U5 are combined in the same separating means. But they may be installed in different systems. In the embodiment, five finishing units are employed, but the number of the units may be freely selected and determined in accordance with producing conditions and properties of the rice.

Components of the finishing units, namely, the supply guide means 9*a*, the cylindrical rotary brushing means 9*b*, the supply smoothing and regulating means 9*c* and the combing wedges 9*d*, 9*d'* should be arranged respectively in proper positions in accordance with the supplying directions (directions E and G in FIG. 5) of the rice grains Ri and other conditions.

The rice grains Ri are hopping at a moment when the rice grains fall on the brushes, so that the foreign debris pa such as fine powders and the like remaining on the rice grains Ri are separated from the rice grains Ri and sucked up in a direction D under a reduced pressure and via an exhausting pipe 13*a* led to the solid-gas separating means 13 constituted by a cyclone or a bug filter. The solid-gas separating means 13 discharges the separated foreign debris and at the same time the separated air is exhausted by the suction fan 13*b*.

The separating means 9 is surrounded by walls 12, 12 so as to form a proper sized compartment. A continuous shut-off means 11*a* such as rotary vale or the like is form at the outlet 11 of the wash-free rice.

A blower 15, of which sucking capacity is a slightly lower than that of the sucking fan 13*b*, is arranged at the bottom of the separating means 9. Air from the blower 15 is mixed with ionized air at an ionized air mixer 15*a* and is filled in the compartment of the separating means 9 via a blown air inlet 10 as keeping the compartment at a reduced pressure so that the separated fine powders are discharged by a suction force of the suction fan 13*b*.

The static electricity eliminating apparatus comprises an ion generating unit 14*a*, a supply means 14*b* for supplying an ionized air ai, a selector valve 14*d* and a check valve 14*f*.

In the supply guide means 9*a* of the finishing units U2 to U5 are slightly different from the supply guide means 9*a* of the finishing unit U1 such that a plurality of the parting plates S in these units are arranged in parallel each other.

Other than the screw conveyer, the bucket conveyer and the pneumatic transporting means, vibration transporting means which employs an electromagnetic vibration method, a motor vibration method or the like may be used as the transporting means. A proper transporting means should be selected among these means in accordance with an arrangement of the wash-free rice producing apparatus and surrounding conditions.

The base plate 9B in FIG. 6 may be constituted by a net. When the net is employed, resistance against upward flows of the sucked air is reduced together with effects of the supply smoothing and regulating means.

As a material for the net, plastic fibers may be employed in stead of stainless steel fibers, if the plastic fibers have a sufficient tensile strength.

Other Embodiment

Figure 7:
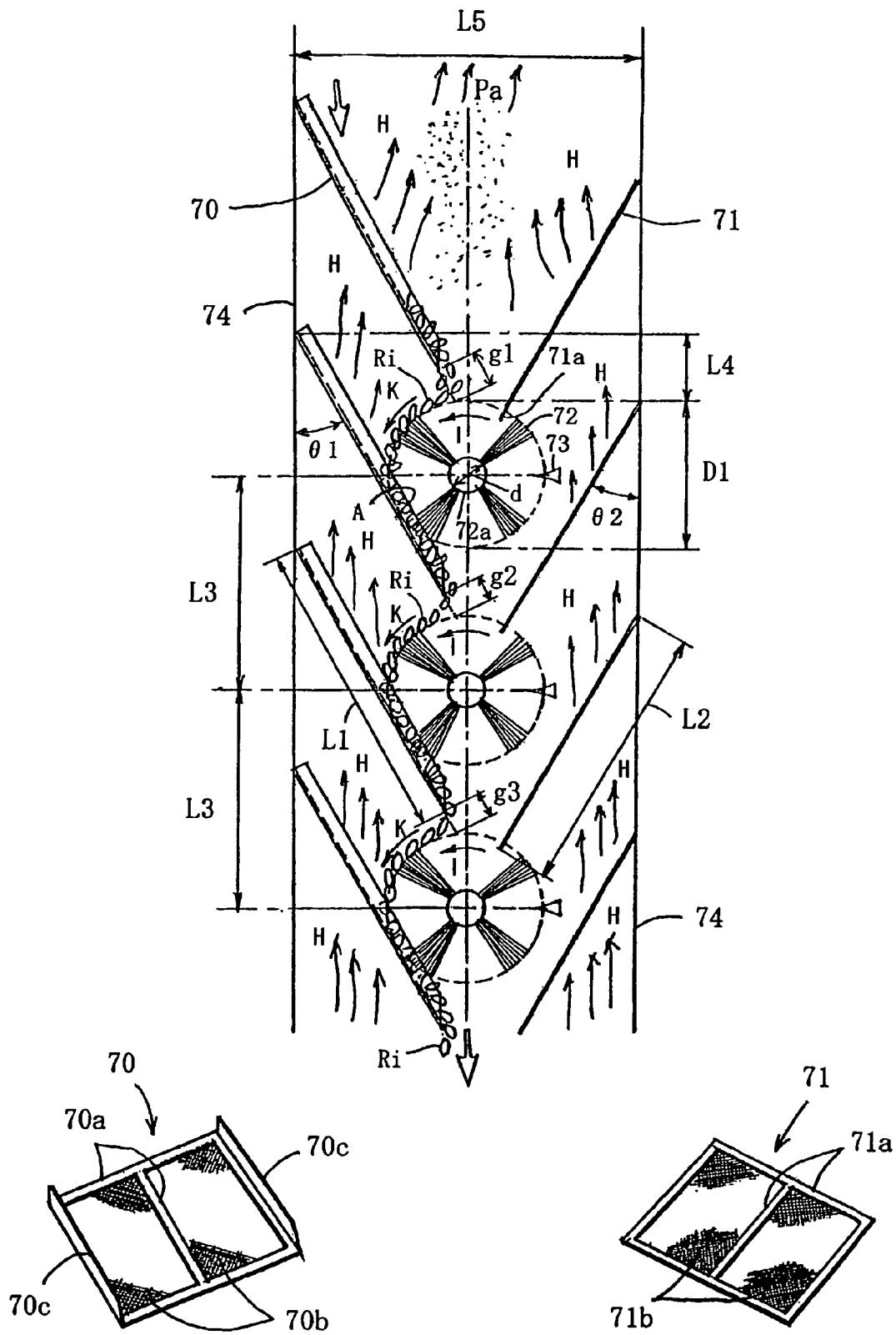
FIG. 7 is a schematic side view illustrating combined units of another example of a separating means.

As specified in claim 11 and shown in FIG. 7, a finishing unit comprises a supply guide means 70, a supply guide aiding means 71, a rotary brushing means 72 and a combing wedge 73. The supply guide means 70 constituted by a permeable net with a sifting structure and the supply guide aiding means 71 are slantingly arranged respectively at predetermined angles θ1 and θ2. The ends of the supply guide means 70 are positioned above the rotary brushing means 72 so as to keep gaps g1, g2 and g3 such that rice grains Ri from the supply guide means 70 form holdups there. The coming wedges 73 always clean tips of the brushes of the rotary brushing means 72. In this embodiment, all components are designed beforehand in order to fit the all components in predetermined positions easily.

FIG. 7 is the schematic side view illustrating combined finishing units of another example of the separating means 9.

As shown in FIG. 7, the supply guide means 70 are slantingly arranged and the respective cylindrical rotary brushing means 72 (in the present embodiment long and soft bristles are employed as a material for the brush) are positioned under the ends of the supply guide means 70 apart from the gaps g1, g2 and g3. The cylindrical rotary brushing means 72 is revolved around axis 72a in a direction K such that the rice grains Ri are carried rather slowly by the brushes in a reverse direction to a falling direction of the rice grains Ri from the supply guide means 70. The coming wedge 73 is positioned such that it always cleans the brushes of the cylindrical rotary brushing means 72. In the present embodiment, three units are employed. The supply guide aiding means 71 are assigned to respective supply guide means 70. The supply guide means 70 and the supply guide aiding means 71 are slanted to a vertical wall 74 with angles θ1, θ2 respectively. In the present embodiment these angles are set at 30 degree. Since the rice grains falling from the supply guide means 70 are rubbed in the reverse direction K by tips of the brushes of the cylindrical rotary brushing means 72, fine powders such as parched bran and the like on the surfaces and in dents of the rice grains are floated. As a result such brush arrangement is effective to eliminated fine powers easily.

Different features of the present embodiment from the previously explained embodiment are as follows: 1) the supply guide means 70 and the brushes are arranged such that a contour of the brushes is contacted with the supply guide means 70 at a point A; 2) the end of the supply guide aiding means 71 is slightly inserted into the contour of the brushes. In order to attain these features, respective components of the finishing unit are designed and formed beforehand. Effects to separate fine powders such as parched bran and the like on the surfaces and in dents of the rice grains are enhanced by the feature 1), because the fine powders are caught and rubbed by the brush. The feature 2) has a function to regulate the rice holdup and at the same time it enhance an eliminating effect of the fine powders from the brush together with a function of the combing wedge 73.

As shown in FIG. 7, the supply guide means 70 is constituted by a frame 70a made of a rigid material, for example a metal, and a net 70b. Upright hems 70c are formed on both sides of the supply guide means 70. In the same way, the supply guide aiding means 71 is constituted by a frame 71a made of a rigid material, for example a metal, and a net 71b. A mesh for the nets 70b and 71b is determined such that rice grains can not pass through the mesh, but fine particles of the parched bran can pass through the mesh.

Either metals or resins can be employed as materials for the nets 70b and 71b. The materials having a high tensile strength and elasticity, are desirable.

Since main portions of the supply guide means 70 and the supply guide aiding means 71 are formed in the net structure, air bearing the ionized air flows upward (depicted as arrows H) as separating and sifting the parched bran from the rice grains Ri. The rice grains Ri are moved downward in the direction K along with the revolving brushes and collected as finished rice. Fine powders Pa such as the parched bran and the like are carried by the upward flowing air and discharged outside of the separating and finishing means.

Dimensions of the main portions of the present embodiment are set as follows. A length L1 of the supply guide means 70 is 135 mm. A length L2 of the supply guide aiding means 71 is 120 mm. An outer diameter of the cylindrical rotary brushing means 72 is 70 mm. A diameter d of the axis 72a is 15 mm. A distance L3 between the two neighboring the cylindrical rotary brushing means 72 is 100 mm. A length L4 in FIG. 7 is 30 mm. A width L5 between the two walls 74 is 150 mm. The gaps g1, g2 and g2 are respectively set 15 mm, 10 mm and 10 mm.

The dimensions are not limited to the above-mentioned digits, but they can be determined in accordance with various conditions. The number of the units is not limited to three as shown in FIG. 7. The separating means may be arranged upright as shown in FIG. 7 or may be arranged slantingly. The arrangement can be determined freely in accordance with a capacity of the separating means and arranging conditions.

A suction efficiency and an exhausting efficiency are improved by the constitution explained above, so that the inside of the separating means can be always kept in good conditions.

In the present embodiment, the separating means is accommodated in a boxed housing in which the sucked air flows upward. Whole or a part of the upright wall is formed as a hinged door, so that the separating mean can be easily maintained.

A safety device to stop whole operations instantly may be arranged for emergency in order to keep the wash-free rice producing apparatus in safe conditions.

In conclusion, features of the present invention are as follows.

1) Since water is not used for producing the wash-free rice, quality of the rice is not deteriorated and a best-before date is prolonged.

2) Since the parched bran used for polishing does not contain other additives, it is safely used without mixing in any foreign debris.

3) Hard and sandy parched bran is obtained by parching defatted bran at a high temperature (for example ca. 120☐).

When the parched bran is mixed with polished rice, skin bran on the surfaces of rice grains can be removed as if the rice is polished by sand.

4) Since the parched bran used in the embodiments by the present invention contains 0% of water, 0.5% of oil, no living germs and no worm eggs and has no unpleasant smells of raw bran, it is hygienic and ideal abrasive.

5) Since the surfaces of rice grains and skin bran contain 20% of oil, usually it is rather difficult to remove the skin bran. But the parched bran which contains very little amount of oil, can effectively remove oil and skin bran on the surfaces of rice grains.

6) Since parched bran for polishing rice contains less oil so that it is hard and dry, it is easily separated from polished rice.

7) Since static electricity generated by the rice flow is eliminated by the static eliminating measure, the bran and the foreign debris are prevented from sticking to the polished rice and the inside of the wash-free rice producing apparatus so that the inside of the apparatus is kept in good conditions in terms of hygiene and quality of the rice.

8) In the separating means 9, together with the static eliminating measure mentioned in 7) upward flowing air in this means can remove remaining fine powders such as the bran and the like out of the separating means completely, so that inside of this means can be kept in quite good conditions, thus wash-free rice of excellent quality can be provided.

Possibilities of Industrial Use

As explained above, the present invention can provide the wash-free rice producing method and apparatus. The method by the present invention uses rice polishing bran (parched bran), of which patent right is owned by the applicant (Japanese patent No.3453127), as the abrasive in order to remove bran and foreign debris sticking to surfaces of rice grains. The method by the present invention comprises the stirring step, the sifting step, the separating step and the bran recovering and recycling step in order to use the collected and recycled bran as the abrasive. The apparatus comprises not only the units to operate the above-mentioned steps, but the electrostatic dust eliminating means, which supplies ionized air to the removed bran and foreign debris in order to preventing them from sticking to the polished rice grains in the succeeding steps to the sifting step.

What is claimed is:

1. A method for producing wash-free rice which does not require washing before cooking in a waterless environment comprising steps of:
    performing a wash-free rice producing operation including:
    preparing polished rice from brown rice polished by a built-in rice polishing machine and sifted by a built-in sifting machine or polished rice from outside sources;
    preparing parched bran used as an abrasive for polishing rice;
    preparing a mixture consisting of said polished rice and said abrasive in a desired ratio;
    stirring said mixture in a tank by revolving stirring blades such that said polished rice and said abrasive are mutually rubbed in order to strip sticking bran including skin bran and foreign debris from the surfaces of rice grains;
    sifting said stirred mixture in order to separate bran from the rice grains;
    separating residual sticking bran and foreign debris from the sifted rice grains in order to obtain finished wash-free rice;
    recovering the separated bran for recycling the bran as the abrasive, wherein:
    in said stirring step, a revolving rate of said stirring blades is raised, if a surface level of said mixture in said tank is lower than a predetermined level either (1) at the end of the wash-free rice producing operation or (2) said mixture is not filled to capacity of said tank;
    supplying ionized air from an ion generating apparatus to said sifting step and said separating step in order to eliminate static electricity so that foreign debris are prevented from sticking to the finished rice grains again; and
    wherein in said separating step, said ionized air flows upward, while rice grains flow downward to eliminate static electricity effectively from the rice grains.

2. The method according to claim 1, wherein:
    said sifting step is carried out in a tilted cylindrical sifting machine of which contour is formed by a mesh net such that said bran is separated from rice grains as said mixture is being flowed downward by revolving said tilted cylindrical sifting machine.

3. The method according to claim 1, wherein:
    said separating step is a step for separating foreign debris sticking to the surface of the sifted rice grains, and
    said separating step is carried out by one or more finishing units, each of said finishing unit comprising:
    a supply guide means for supplying rice grains uniformly;
    a cylindrical rotary brushing means for brushing the surfaces of the rice grains;
    a regulating means for smoothing a layer of supplied rice grains and regulating a holdup of the supplied rice grains, and
    a combing wedge for cleaning brushes of said cylindrical rotary brushing means, wherein:
    the rice grains are supplied uniformly in a reverse direction to a revolving direction of said cylindrical rotary brushing means as regulating the holdup and a retention time of the rice grains so that the rice grains are rubbed by said cylindrical rotary brushing means in order to strip foreign debris sticking to the surfaces of the rice grains;
    finished rice grains are taken out as wash-free rice; and
    the separated foreign debris are sucked and discharged by a solid-gas separating means.

4. An apparatus for producing wash-free rice which does not require washing before cooking, comprising:
    a polished rice tank for accommodating polished rice from brown rice polished by a built-in raw rice polishing machine and sifted by a built-in sifting machine or polished rice from outside sources;
    a stirring means for mixing a mixture consisting of the polished rice and an abrasive in a desired ratio by revolving stirring blades;
    a transportation means for transporting said stirred mixture consisting of policed rice and bran;
    a sifting means for sifting bran from the polished rice;
    a water-free separating device comprising cylindrical rotary brushers for stripping residual foreign debris from the surfaces of rice grains in order to obtain finished wash-free rice grains; and
    a separated bran recovering means for recycling the bran as the abrasive, wherein:
    said stirring means comprises:
    a vertical revolving axis equipped in a vertical rotary housing:
    a plurality of revolving blades arranged radially around said vertical revolving axis in a plurality of stages;
    a shut-off valve arranged at the bottom of said vertical rotary housing;

a control means for controlling a revolving rate of said revolving blades in accordance with a level of the mixture in said vertical rotary housing and for controlling a supply amount of the stirred mixture;

an ionized air apparatus connected to said sifting means and separating device for eliminating static electricity; and said ionized air apparatus comprises an ionized air generator and an ionized air transporting means, and wherein:

in said separating device, said ionized air flows upward, while rice grains flow downward for eliminating static electricity effectively from the rice grains.

5. The apparatus according to claim 4, wherein:

said sifting means is a tilted cylindrical sifting machine of which contour is formed by a meshed net; and one or more series of guides made of a plurality of baffle plates are arranged obliquely inside of said tilted cylindrical sifting machine so as to sift the mixture as being revolved and moved downward for separating the bran from the rice grains.

6. The apparatus according to claim 4, wherein:

said water-free separating device is for separating foreign debris sticking to the surface of the sifted rice grains, and said water-free separating device is constituted by one or more separating units, each of said separating units comprising:

a supply guide means for supplying rice grains uniformly;

a cylindrical rotary brushers for brushing the surfaces of the rice grains;

a regulating means for smoothing a layer of supplied rice grains and regulating a holdup of the supplied rice grains; and a combing wedge for cleaning said cylindrical rotary brushers, wherein:

foreign debris are separated from rice grains; and said separated foreign debris are sucked and discharged by a solid-gas separating means.

7. The apparatus according to claim 6, wherein:

said separating unit further comprises:

a downwardly tilted supply guide means constituted by a base plate and parting plates widening toward their end portions arranged on the base plate;

each of said cylindrical rotary brushers comprising plural brushes on its cylindrical body below the end of said supply guide means, wherein the brushes are revolved so as to lift failing rice grains;

said regulating means for smoothing a layer of the supplied rice grains and for regulating a holdup of the supplied rice grains varies a gap between said cylindrical rotary brushers by regulating a tilting angle of said regulating means in accordance with supplied amount of rice grains; and a combing wedge which cleans the brushes of said cylindrical rotary brushers.

8. The apparatus according to claim 6, wherein:

said separating unit comprises:

a supply guide means;

a supply guide aiding means;

a cylindrical rotary brusher; and a combing wedge; wherein:

said supply guide means and supply guide aiding means is each constituted by a permeable net with a sifting structure and arranged at a predetermined slanting angle;

a gap formed between an end of said supply guide means and an end of said cylindrical rotary brusher is maintained such that falling rice grains are lifted by revolving brushes of said cylindrical rotary brusher; and said combing wedge cleans said brushes.

\* \* \* \* \*